Oct. 10, 1961
D. C. SUMMERS
3,003,267
LAUNDRY IDENTIFICATION EQUIPMENT
Filed April 1, 1958
3 Sheets-Sheet 1
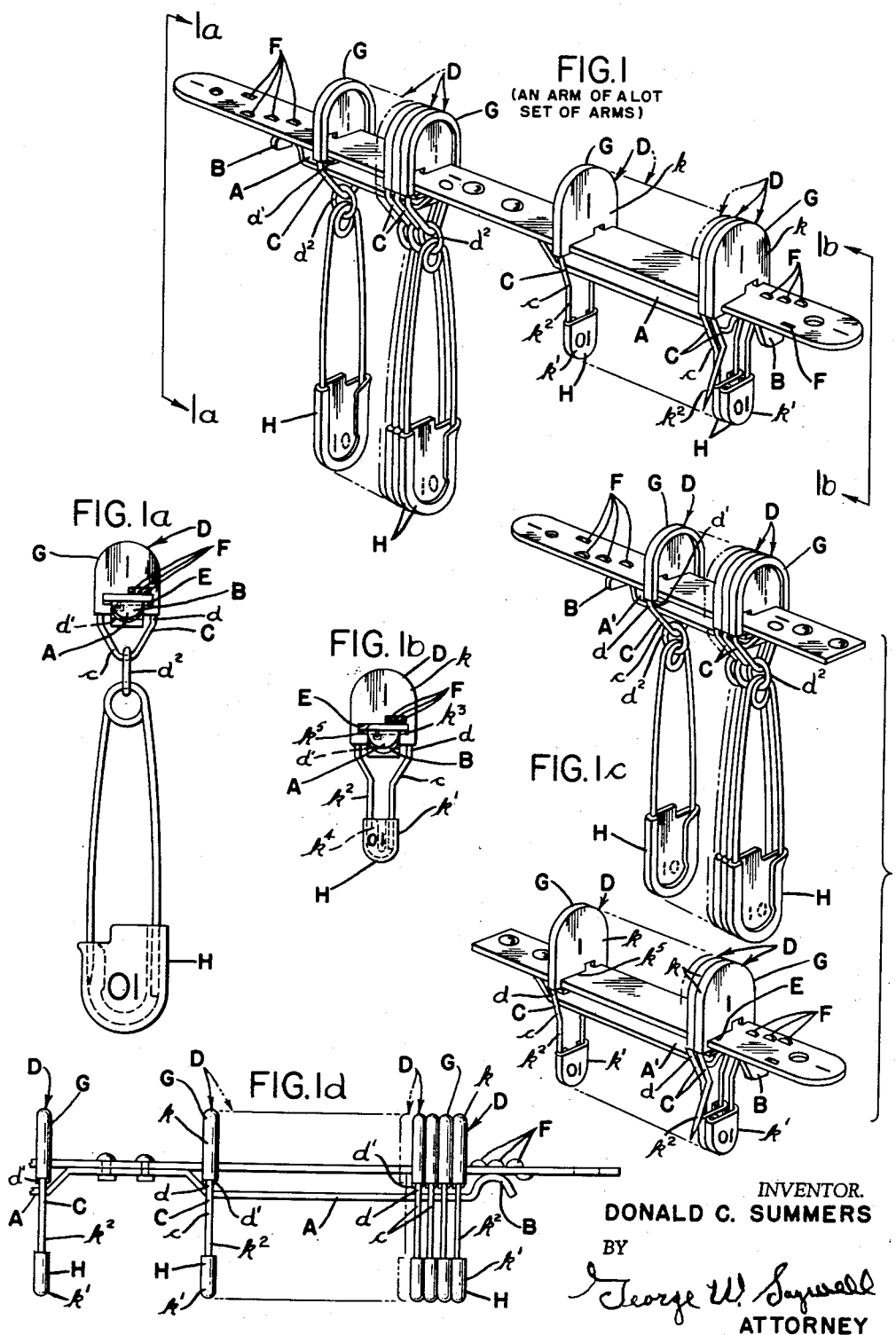
INVENTOR.
DONALD C. SUMMERS
BY
George W. Saywell
ATTORNEY Oct. 10, 1961 D. C. SUMMERS 3,003,267
LAUNDRY IDENTIFICATION EQUIPMENT
Filed April 1, 1958 3 Sheets-Sheet 2

(A CONTROL SET)

(A LOT CARRIER)

INVENTOR.
DONALD C. SUMMERS
BY
George W. Saywell
ATTORNEY

Oct. 10, 1961 D. C. SUMMERS 3,003,267
LAUNDRY IDENTIFICATION EQUIPMENT
Filed April 1, 1958 3 Sheets-Sheet 3

(MODIFIED DESIGN OF FLAG)

(A FLAG SET)

(CHECKING ARM HAVING FLAGS AND SMALL PINS)

(CLASSIFICATION RACK)

INVENTOR.
DONALD C. SUMMERS
BY George W. Saywell
ATTORNEY

United States Patent Office 3,003,267
Patented Oct. 10, 1961

3,003,267
LAUNDRY IDENTIFICATION EQUIPMENT
Donald C. Summers, Allentown, Pa., assignor to The Key-Tag Checking System Company, Cleveland, Ohio, a corporation of Ohio
Filed Apr. 1, 1958, Ser. No. 725,723
7 Claims. (Cl. 40—19.5)

The purpose of the invention is to provide equipment that will insure the correct packaging and prompt return to the individual customers of all of the respective customers' pieces.

Quite a problem is involved in laundry identification because each customer's bundle must be broken up into many different classifications for laundry processing.

For instance, classifications for washing normally include whites, colors, starched, no-starch, nylons, woolens, and probably many others.

Classifications for finishing work include shirts, wearing apparel, flatwork, tumblework, hose, handkerchiefs, and also probably many others.

Two general types of laundry identification methods are generally recognized at the present time, viz., full identification and partial identification.

In the full identification system, each item in the customer's bundle is marked individually. This marking is done in many ways, such as pen and ink marking, heat-sealed tabs, by marking machines, and a large number of other methods and devices.

It is evident that when all items are marked there is no need to keep the items of a single customer's bundle together but that such items may be mixed with the items from other customers and thus a maximum use of productive machinery and labor is secured. The mixed items from a number of customers in such a system are known as a "lot" of laundry.

The partial identification system is commonly called the pin and net system and by this system the items of any one customer's bundle are separated into proper washing classifications, then netted according to the washing classifications, and the nets identified by large safety pins attached thereto and carrying the customer bundle number. For instance, one net may contain the white work from the bundle of the customer, another the colored work, another the starch articles, another the no-starch articles, etc. When assembling, nets assigned the same number are brought together.

Great disadvantages attach to the use of either of the above-mentioned two systems of identification.

Full identification involves more marking operators, more space, and high marking room and final assembly costs. It is evident that it is a long procedure where it is necessary to mark every item in every bundle and to locate all these items in a lot of many bundles for final packaging and delivery. Also, if there is no mechanical check on the accuracy of the workers involved in such full identification procedure, there is always possibility of error.

The partial identification system permits faster marking procedure than the full identification system and also simplifies the final assembly operations since only the nets need be brought together. However, it is especially effective only when used for unfinished or semifinished services where the units of the bundle may be kept close together. Also, it is economical only where the individual bundles are large since small bundles do not fully load the nets. The partial identification system has been commonly used only to the wet assembly. At this wet assembly it is customary to return the pin sets to the original marking table and use some other means of identification for the purpose of carrying the items through the finishing operations. Of course, this necessitates a second break of the bundle at the wet assembly and a reclassification of the items thereof for finishing. Such procedure is costly. Furthermore, there is the probability of items being misclassified during the reclassification.

Another factor increasing the cost of the partial identification system is of more recent origin in that laundry customers are now utilizing more finished services and also smaller individual customer bundles than formerly. A decrease in the size of the customers' bundles leads to a corresponding increase of nets only partially filled and thus costs are increased since it is impracticable for identification purposes, in the partial identification system as now practiced, to net the pieces from more than one customer in a single net.

Furthermore, since the present trend is to require, for any given number of laundry items, more finishing service, some additional identification means is necessarily required to carry the customer's pieces through the entire laundry plant. Such additional procedures increase the chances of error and the real purpose of laundry identification is defeated.

There has been extended use of a combination of these two systems for laundry identification. However, no such combination has been so acceptable as to become standardized. The combination usually consists of fully identifying some articles such as shirts and netting other articles such as flatwork and tumblework and pinning the nets. There is no uniformity and standard practice. Thus, there are used a hodge-podge of laundry identification methods and systems the results of which have been faulty identification, a great problem of worker training, and an unreasonable increase in the burden of laundry management.

It is well within reason to state that all the activities of a laundry revolve around its identification system. Overall this means what are the costs and what is the customer satisfaction. In detail it means how fast or how slow is the workflow, what processing procedures can be used, the speed of customer service, packaging procedures, and laundry charges. Everything considered, the best identification system is the one which leads to the greatest overall efficiency for the entire laundry plant.

A word may well be said concerning the desirability of almost perfect laundry identification procurable at a reasonable cost. Even with the present quite unsatisfactory identification methods and equipment used therein, costs for identification of from twenty-five (25) to forty (40) percent of the total laundering costs are not uncommon. Also, there should be considered the customer's reaction to a faulty return of the items of a laundry bundle. The customer expects the laundry to return each and every article sent and such expectation is reasonable. The customer makes a comparison between the situation for home laundering where articles cannot be lost and public laundering where items are frequently lost or their return delayed. Therefore, in addition to whatever claims may be involved, dissatisfied customers are lost, smaller bundles are sent to the laundries, and there is a general public distrust of the value of the service rendered by the laundries.

Inasmuch as public laundries process thousands of items each day, and all identification systems are based on a practice of assembling a customer's bundle by matching numbers, letters, or other like characters, mistakes are caused by the failure of employees to read the numbers, letters, or like characters, correctly. Therefore, a mechanical check is necessary to prevent the human errors and eliminate the mistakes.

Full identification systems using a mechanical check are known; as also, pin and net systems using mechanical checks.

However, prior to the instant invention, no satisfactory system has been used with mechanical checks that permitted a combination of the pin and net system with a full identification system.

Such combinations of the two systems heretofore attempted have failed for the following reasons:

(1) Any equipment used for mechanically checking both nets and individual pieces has been limited to a system where the bundle is the unit and did not permit the mixing of the contents of the various bundles within a lot of bundles.

(2) Equipment that is used for mechanically identifying a lot of bundles cannot be used for marking nets containing only items from one bundle.

(3) Equipment used for mechanically fully identifying every item sent to the laundry could not be used for closing and identifying nets.

The present invention is a combination of improved equipment for both the partial and the full identification systems together with a positive mistake-proof protection for every bundle item all the time it is in the laundry plant by means of a mechanical check thereof. It is a lot control identification using mechanical checks.

The annexed drawings and the following description set forth in detail certain improved equipment utilized in laundry identification, such equipment being only one form, illustrating the various forms thereof embodying the principle involved in the invention.

In said annexed drawings:

FIGURE 1 is a perspective view of one arm of a lot set of improved arms upon one end of which are assembled small individual-piece tag and pin assemblies, and upon the other end of which arm are assembled large net tag and pin assemblies utilized for closing nets whose contents consist of laundry pieces of one customer classified according to respective washing operations;

FIGURE 1a is an end elevation, from the large pin end, of the arm and equipment shown in FIGURE 1;

FIGURE 1b is a view similar to FIGURE 1a but taken from the small pin end of the arm shown in FIGURE 1;

FIGURE 1c is a view similar to FIGURE 1 in which the arm of the lot arm set is subdivided into two parts, from one of which parts the large net pins are suspended, and from the other of which parts the small individual-piece pins are suspended;

FIGURE 1d is a fragmentary side elevation of an arm in which the pins suspended from the arm are all small pins;

Referring to the annexed drawings in which the equipment shown is illustrative of improved equipment used for carrying out the improved laundry identification, some of which equipment is of improved construction and hereinafter claimed, and in which drawings the same respective elements are indicated in the several views by the same characters, the customer's bundle of soiled laundry when received by the laundry is routed to a marking table which is adjacent a classification rack, FIGURE 8. A suitable number of trucks, according to the amount of laundry the wash room will handle, by total weight, at one time, is also lined up adjacent the marking table; as well as a truck containing the mechanical checking sets, these latter trucks being rolled about the laundry plant for positioning at any one time at such part of the premises as the checking devices conveyed by the truck are required.

Figure 6:
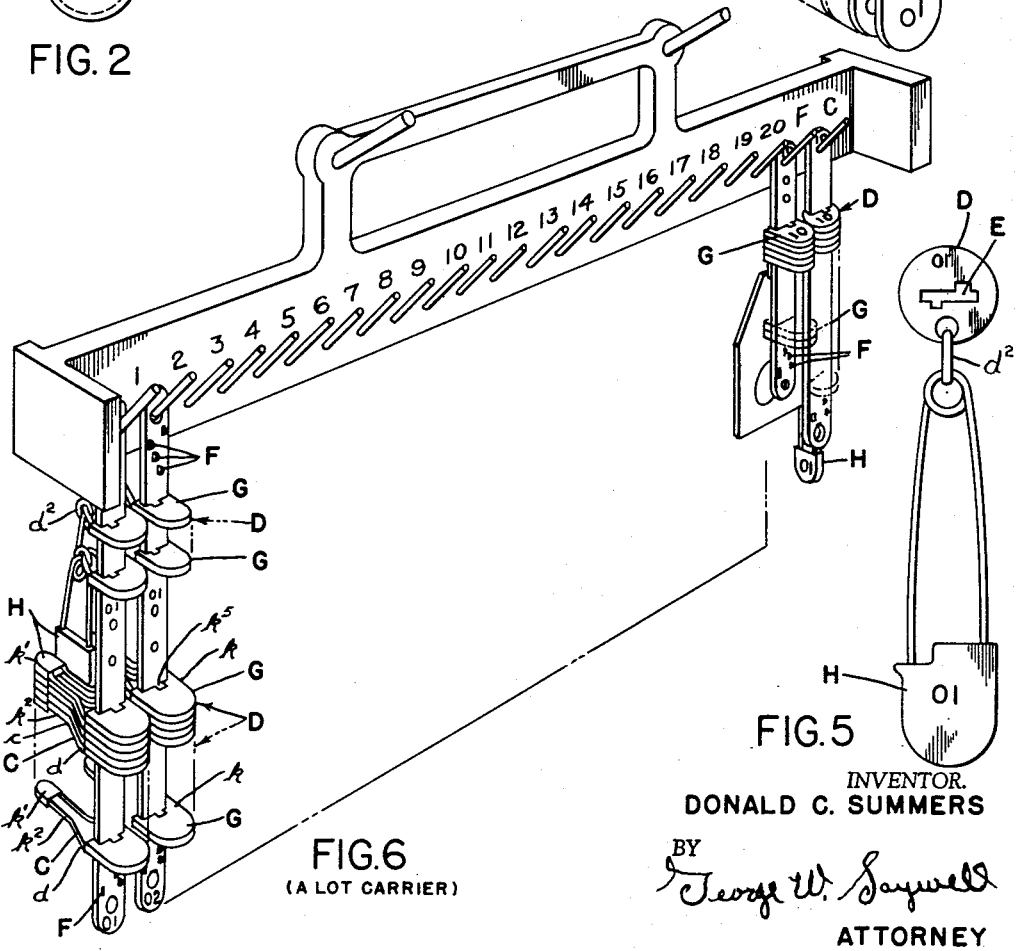
FIGURE 6 is a perspective view of a lot carrier upon which can be mounted twenty of the arms shown in FIGURE 1, one of the control sets shown in FIGURE 4, and one of the flag sets shown in FIGURE 7.

One satisfactory method of carrying out a procedure utilizing the improved equipment is to hang an empty lot carrier, FIGURE 6, to the right of the operator working at the marking table and to remove from the carrier truck, a lot carrier, FIGURE 6, having a full complement of checking equipment and hang such equipment to the left of the operator.

A customer's bundle is weighed and the weight is noted on a suitable customer's laundry ticket. Then No. 1 arm, FIGURE 1, of lot 01 is removed from the full lot carrier at the left of the operator and positioned in a socket provided adjacent the marking table. It is found most convenient to mount this socket parallel to the backboard of the marking table, thus permitting net pins, FIGURE 1a, to be removed from one end of the arm, FIGURE 1, and individual-piece pins, FIGURE 1b, to be removed from the other end of the arm.

It will be noted that the bundle number appears on both of the pins shown in FIGURES 1a and 1b, and also the lot number, the bundle number "1" being at one end of the pin and the lot number "01" at the bottom end of the pin. A "lot" is a reasonable working number of bundles, usually about twenty bundles, and, where necessary to specify, will herein be considered as consisting of twenty bundles. In fact, the whole identification system carried out by the improved equipment might well be called a lot control system.

As a precaution covering the possible mistake of the marking operator recording the wrong number, the bundle number and the lot number, taken from the arm, FIGURE 1, are recorded on the customer's ticket, and an individual-piece pin showing the same bundle number and lot number, FIGURE 1b, is removed from the arm, FIGURE 1, and pinned to the customer's ticket. This FIGURE 1b pin stays on the customer's ticket until final assembly and assures the ticket at that point being associated with the bundle of the right customer.

As the pieces are removed from the customer's bundle, each piece is considered to fall into one of two groups A and B. For purposes of illustration, one group A is divided into flatwork, tumble work, handkerchiefs, and hose. All pieces of this group are netted in individual customer's nets, there being a plurality of these nets each suitably designated by a classification which insures the proper washing of the articles in the several nets. This classification is usually accomplished by using nets of different colors. Of course, the handkerchiefs and hose are netted in smaller nets than the flatwork and tumble-work. The closing of these nets is effected by the pin shown in FIGURE 1a. These closed nets, after each bundle is marked, are placed into washing trucks properly classified according to suitable washing treatments.

If more pins, FIGURE 1b, are required than the arm, FIGURE 1, is carrying, the next arm 2 of that lot set of arms is made use of, by removing that arm from the full lot carrier, FIGURE 6, the number thereof (2) recorded on the customer's ticket, and a FIGURE 1b individual-piece pin from that No. 2 arm fastened to the customer's ticket. Thus at the final assembly two FIGURE 1b pins will be noted on that customer's ticket and proper checking, hereinafter described, effected to cover this contingency.

It will be recognized that the marking and netting immediately hereinbefore described partakes of the characteristics of a partial identification system, viz., a pin and net system.

The second group (B) of laundry pieces taken from the No. 1 customer's bundle may be considered, for illustrative purposes, as wearing apparel, shirts, and fugitive pieces. These pieces, as they are removed from the customer's bundle, are pinned with FIGURE 1b pins, one pin for each laundry piece. When pinned they are thrown into a proper net on the classification rack, FIGURE 8, and the net or nets closed with FIGURE 5 net pins after the entire lot has been marked. This classification rack, as noted in FIGURE 8, holds a large number of nets of the various laundry pieces, fugitives, nature of starching, etc., these nets being classified by colors and stripes, according to washing requirements; oftentimes, as many as twenty-five or more different colored or striped nets.

Any particular net on the classification rack receiving the B group laundry pieces is set aside as it becomes filled and an empty net put in its place. Also, if the FIGURE 1b pins are required from two arms, FIGURE 1, proper noting thereof is made as hereinbefore explained with reference to FIGURE 1a pins removed from FIGURE 1 arms. However, this marking of the laundry pieces of the second group is a lot marking. The FIGURE 1b individual-piece pins have a bundle number and a lot number designation thereon, but the nets on the classification rack are closed with FIGURE 5 pins and are not fastened until the whole lot of bundles has been classified. This is different from the procedure regarding group A wherein the nets are fastened, after the pieces from each customer's bundle are removed, with FIGURE No. 1a pins.

Figure 5:
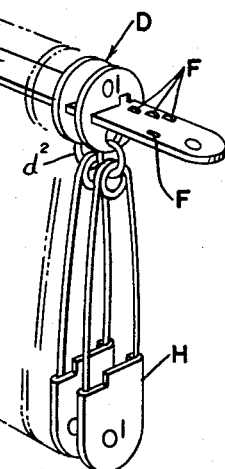
FIGURE 5 is an elevation of one of the tag and pin assemblies shown in FIGURE 4.

The closing of the nets which have been filled with group B garments on the classification rack is effected, when the whole lot of bundles is classified, at the marking table, by FIGURE 5 pins which, it will be noted, are designated by the lot number only. In other words, the articles of the second group B from all twenty bundles of a lot, or from such bundles of the lot as have such articles, go into the nets which are closed with FIGURE 5 pins so that to this extent the classification of group 2 is a lot classification. However, it must be remembered that each piece in each net in this lot is marked with a FIGURE 1b individual-piece pin so that the characteristics of a full identification system are used. The FIGURE 1b pin, as noted, has a designation for both the lot and the particular bundle of the lot to which the laundry piece belongs.

Regarding this marking of the bundle by the pins from the No. 1 arm set shown in FIGURE 1, it should be remembered that the operator at the marking table never has more than the bundle of one customer in front of her at one time and is removing the mechanical checks from only one FIGURE 1 arm at that time. Therefore, there is no possibility of using wrongly marked pins for any of the garments taken from that particular bundle.

The marking continues for the several bundles in order and, when the entire lot of bundles is thus marked, the nets containing the garments of the second group are closed with the FIGURE 5 pins and the nets thrown in the proper respective wash trucks.

Figure 3:
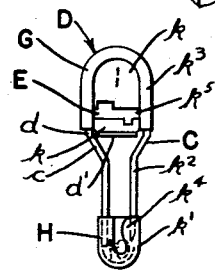
FIGURE 3 is an inside elevation of one of the small tag and pin assemblies shown in FIGURE 1.

When all the pieces in all the bundles of a lot have been completely marked, by netting the first group (A) by individual customers, and the nets, after being closed by FIGURE 1a pins, thrown into the respective proper wash trucks, and by all the pieces of the second group (B) having been pinned with individual-piece FIGURE 3 pins, the pieces deposited in the properly segregated net of the classification rack, the nets closed with FIGURE 5 pins after the entire lot has been marked, and the nets thrown in the wash truck, then the lot carrier on the marker's right is full and is returned to the carrier truck. Thus, the classification is ready to be again set up and the marking operator is ready for the marking of the next lot of bundles.

As above stated, the wash room will have a certain handling capacity, usually according to the total weight of the garments, and usually about six lots of garments. It is most convenient to use a number of wash trucks built for that capacity and dispatch them to the wash room when they are filled.

The classification according to washing requirements is as extensive as the different pieces in a whole lot of bundles requires. Both the articles in group A and in group B will reach the wash room in the wash trucks marked according to the different washing requirements. In fact, it is found practicable to place formula cards, shown in FIGURE 8, in the different wash trucks telling the wash room operators what supplies to use and other washing requirements such as time and temperatures. Thus, the wash room man has complete information concerning the washing treatment of the contents of each wash truck and can schedule his work so as to make the most efficient use of the wash room equipment.

Oftentimes, there is necessity for rewashing, or special washing treatment for certain laundry pieces. It has been found most suitable to provide a separate rewash department for this modification of the general process. This department can also handle nylons and other pieces whose particular washing requirements would delay normal production. Since the mechanical checking, hereinafter described, is most expeditiously worked if separate lots of bundles are processed in sequence, it is advisable to handle the rewashing and special pieces as expeditiously as possible in order that the particular lot may be kept intact.

The laundry is then subjected to washing and extracting operations.

The next step is a checking operation at the wet assembly area. However, according to the amount of laundry which the particular plant can most expeditiously handle at the wash room, there may be at this point bundles from a number of different lots, as many as six lots. Therefore, in order to simplify the work, the laundry of these several lots is preassembled by lot before entering the wet assembly area. Such preassembling by lots is effected by removing a net from the wash truck, noting the pin number to ascertain the lot number, and throwing the nets having the same lot numbers into respective separate trucks of a plurality of trucks. Thus, when later the laundry is assembled by lot, each lot will be reasonably complete in itself. This first lot distribution may also be effected by different colored nets for the respective different lots.

At the wet assembly area, racks are provided having sockets for supporting each of the arms, FIGURE 1, between the ends of the arm. Preferably, the racks are divided into two parts and the parts positioned in parallel relation with space in between the two rack parts for accommodating the lot trucks. Thus, in the mechanism described for carrying out the system there will be two racks each having ten stations with sockets for taking ten arms.

A carrier truck utilized for conveying the mechanical checking equipment around the laundry plant, is brought to the wet assembly area with the lot trucks, and the proper checking lot carrier, FIGURE 6, is taken therefrom. The arms, FIGURE 1, are placed in the several sockets at each of the twenty stations with the pin and tag assemblies, FIGURE 1a, facing the assembler. There is no occasion at this point of the checking operation to use the end of the arm carrying the FIGURE 1b pins, since this is a step of the procedure making certain that the flatwork and tumblework bundles are together.

Figure 4:
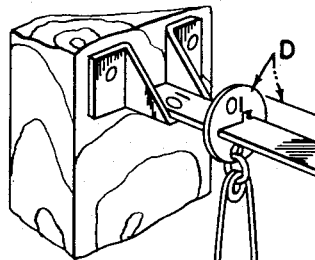
FIGURE 4 is a perspective view of a control set which includes the showing of a support, a bracket in which the set is mounted by the end of an arm of the set, there being mounted on the arm certain tag and pin assemblies for an entire lot of laundry bundles, usually twenty, four of which are indicated in the figure.

The lot carrier, FIGURE 6, also is provided with a socket for the control set arm, FIGURE 4. There is also a socket in the lot carrier for taking the flag arm, FIGURE 7.

Now, the tags on the pin and tag assemblies of the group A, by the tag keys and the cooperating locks, are placed over the respective arms, FIGURE 1, of a lot set of arms. The key, FIGURE 2, on the tag of each pin assembly fastening the nets of this group one, is checked with the locks on the arms, FIGURE 1.

Figure 7A:
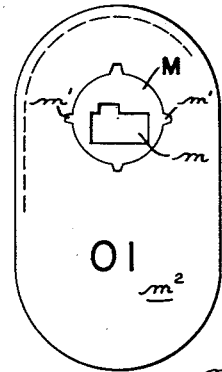
FIGURE 7a is an elevation of a modified design of flag.
Figure 7:
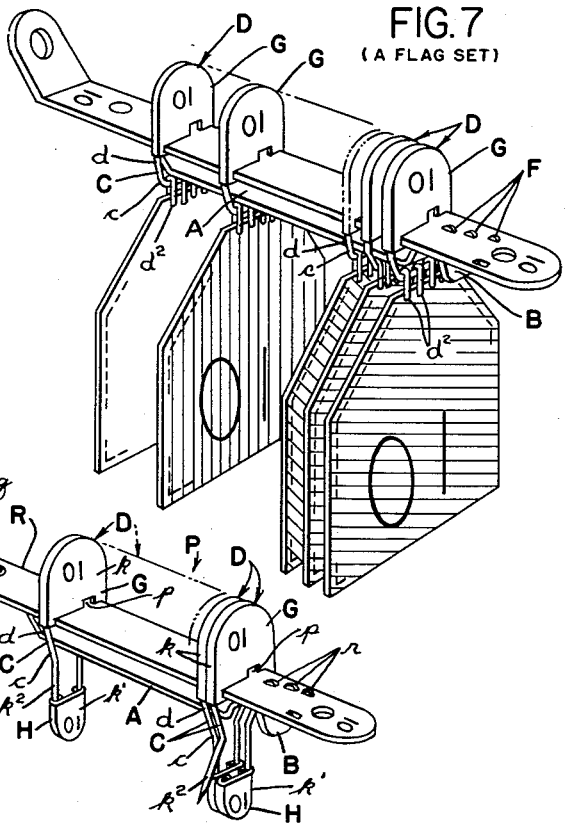
FIGURE 7 is a perspective view showing a flag set comprising a supporting arm and a lot set of different colored flags depending therefrom.
Figure 8:
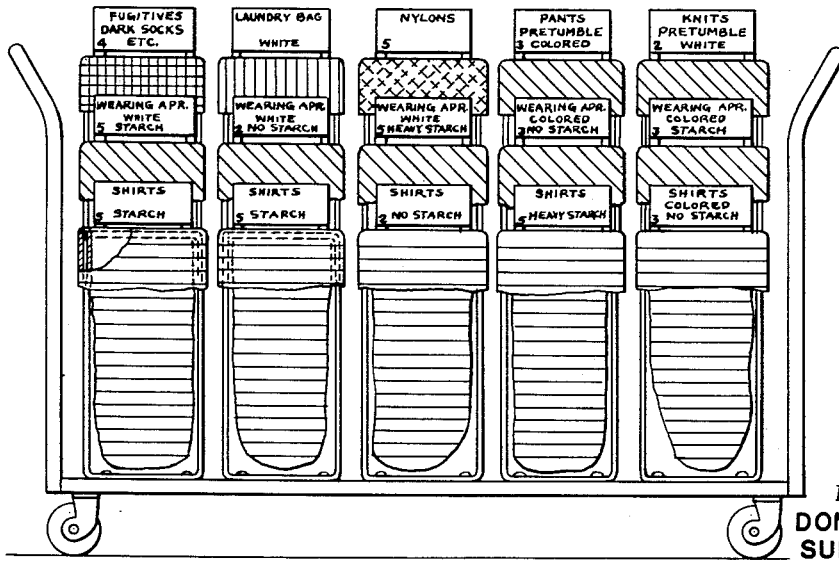
FIGURE 8 is an elevation of a classification rack with different colored or striped nets therein, labels having directions as to what net to use, and indicating the necessary washing classifications; also, numbers for the different wash trucks, and markers for any special washing procedures.

Those nets which were closed with the lot tag and pin assemblies, FIGURE 5, are those from the classification rack, FIGURE 8, and contain, for instance, shirts, wearing apparel, and fugitives, group B with each piece individually marked, as hereinbefore mentioned. These laundry pieces with individual-piece pins, FIGURES 1b and 3, attached are removed from these nets for transfer to the finishing department, preferably by trucks of a supermarket type. Pending such operation, the shirts and wearing apparel are wrapped in a film which will retain the moisture until the garments can be processed. These tag and pin assemblies, FIGURE 5, are checked back on the arm, FIGURE 4, and it is evident that when thus completely checked and if all these tag and pin assemblies are checked, there must be a lot number of such check and pin assemblies on the arm, FIGURE 4, viz., twenty, in the illustration herein set forth. Shortage of check and pin assemblies, FIGURE 5, if any, requires immediate search to locate the missing bundles. This group is transported to the finishing department and differentiating insignia in such form, for instance, as flags of different colors from a flag set, FIGURE 7, are allotted to the respective portions thereof.

The segregated routing of a lot for carrying the lot through the finishing departments is whatever may be reasonably suitable and it has been ascertained that one such suitable segregation is effected by means of a set, FIGURE 7, consisting of different colored flags. For instance, there are a couple of white flags for the flatwork, a couple of red flags for the tumblework, five or six green flags for the wearing apparel, and five or six blue flags for the shirts. The entire lot has assigned to it the necessary number of different colored flags for indicating, as later explained, that the finishing operations for these respective different classes of work have been finished for the whole lot of bundles.

Figure 2:
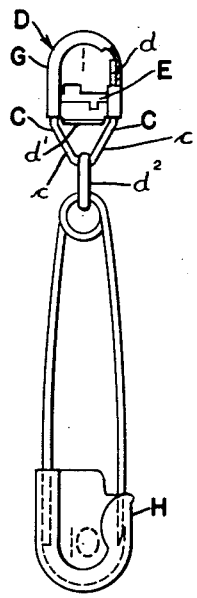
FIGURE 2 is an inside elevation of one of the large tag and pin assemblies assembled on the arm shown in FIGURE 1.

For segregation of the laundry, the nets which contain the tumblework remain pinned with the large tag and pin assemblies, FIGURES 1a and 2, and thus put in trucks for transportation to the tumblers. These pieces are assigned red flags. After the pieces of the tumblework have been processed and folded they are placed in the No. 1 compartment of a twenty-compartment bin. When the lot is complete the red flags are hung on the bin to indicate this fact. This tumblework is identified by the net pins which have accompanied it to the tumblers, and when the nets are opened the pins are hung on the tumbler.

Again, a number of flags may be utilized for facilitating the handling of all the various laundry pieces which would be classified as tumblework, such as shag rugs, special pieces, and the tumblework proper.

The flatwork nets hanging from the several arms, FIGURE 1, and fastened with the large tag and pin assemblies, FIGURES 1a and 2, are removed from the sockets of the rack and placed with the arms and pin assemblies attached in trucks wherein the pin assemblies themselves keep the nets of each bundle together. The lot comprised of these flatwork nets is designated by white flags which are hung on the aforesaid bin to indicate when the lot is complete. In fact, a number of white flags may be utilized for this purpose to permit flatwork ironing to be done by a number of operators. The arms and pin assemblies, for and on these pieces is of no particular inconvenience to the ironing operation since they can be removed from the several nets of a bundle and passed over the ironing equipment after the net contents has been ironed. After ironing and folding, the No. 1 arm, FIGURE 1, is placed on top and the flatwork now completed is placed in the compartment of a twenty-compartment movable bin wherein is contained the tumblework, as hereinbefore described.

The hose and handkerchiefs are likewise handled, being identified by the large tag and pin assemblies, FIGURES 1a and 2, which accompany them.

Each article of wearing apparel is identified by means of the small individual-piece pin and tag assemblies, FIGURES 1b and 3, so these articles are removed from the nets closed with the control set pins, FIGURE 5, and only the proper colored flag from the set, FIGURE 7, is required to hold the whole lot of bundles through the wearing apparel finishing units. The wearing apparel is identified by a number of flags of the same color, green, for instance, one flag going with each portion of the multiple portions into which the lot is divided. Those articles of the lot which are handled in a special manner, for instance, garments which are sent out on hangers, may be hung on a slick rail with an identifying flag over the first hanger. The other garments are folded and placed in the proper compartment of the bin with the flatwork and the tumblework.

The shirts also which are individually marked with tag and pin assemblies, FIGURES 1b and 3, as hereinbefore mentioned, are divided into a suitable number of different units each identified by a blue flag. These also are put on hangers and placed on the slick rail for inspection with a blue flag for lot identification. This blue flag goes over the first hanger to identify the lot. After inspection, each lot is brought to a folding table and folded with the small tag and pin assemblies, FIGURES 1b and 3, still attached. When each portion of the shirt lot is finished and placed in the proper compartment of a shirt bin, this fact is noted by placing the blue flag on that bin.

The shirt inspection and folding lends itself to modified procedure, such as folding the shirts at the shirt units, but the separate inspection and folding procedure hereinbefore described has been found particularly suitable to the mechanical checking system herein described.

Assuming the lot of laundry bundles is thus completed in the bins, it is ready for final assembly and wrapping.

First, the lot carrier, FIGURE 6, with the set of arms, FIGURE 1, and the lot arm, FIGURE 4, is positioned at the side of the wrapping table. The flags, FIGURE 7, are checked on the arm of the flag set, FIGURE 7, to ascertain that the lot is complete. Then the flatwork, tumblework, wearing apparel, and shirts, are removed from the several respective compartments of the No. 1 gathering bin and, inasmuch as the proper arm, FIGURE 1, is with the flatwork of each bundle, this arm is placed on the wrapping table. As the pieces of flatwork, tumblework, hose, and handkerchiefs, are wrapped, the large pin and tag assemblies, FIGURES 1a and 2, accompanying them are checked on the arm.

In like manner the small pin and tag assemblies, FIGURES 1b and 3, are removed from the individual pieces: shirts, wearing apparel, and fugitives, as well as the corresponding pin or pins from the customer's ticket, and checked on the arm. Since all the tags have keys cooperating only with the locks on the proper arm, any error that may have been made in sorting is instantly recognized.

When the proper number of pins, FIGURE 1, is on an arm, the bundle has been completely assembled and is ready for wrapping. Of course, if two or more arms have been utilized for a single bundle, the full number of tags must appear on such two or more arms before the bundle is complete.

When bundle No. 1 has been thus checked and arm No. 1 of the set found to be filled with its quota of pins, the arm is returned to the lot check carrier, FIGURE 6, and the wrapping operator is ready for checking and wrapping bundle No. 2.

Any bundle found to be short in this final checking is temporarily retained, such as by being placed on a shelf above the wrapping table and held until the missing pieces arrive.

Detail of certain improved equipment herein mentioned and used for laundry identification procedure, such as has been illustrated by the aforegoing description, will now be set forth.

Each arm, FIGURE 1, of the arm set, or the arm parts of the two-piece arm, FIGURE 1c, is provided with a relatively spaced flexible metal bar A riveted intermediate its ends, FIGURE 1, or flexible metal bars A', FIGURE 1c, riveted at their inner ends, to the under side of the lightweight arm, or the arm parts, and bent upwardly at their outer ends B so as to abut the arm. The hangers C of the pin and tag assemblies, FIGURES 1a and 1b, pass freely over the bars A and A' when placing such assemblies on or removing them from the arm. These flexible bars A and A' hold the pin and tag assemblies on the arm or arm parts. The tag D, which is also lightweight but is formed over a heavy wire $d$ forming a hanger C, is provided with a slot E serving as a key which cooperates with projections F on the arm that serves as a lock whereby each pin and tag assembly can be checked onto only its complementary arm. The wire $d$ at the edges of the tag D and a lower turned-up portion $d'$ at the bottom of the tag form a guide which eases the arm into the slot E. Between the hanger C and the pin, FIGURE 1a, is a ring $d^2$ from which the pin depends. This ring prevents binding which would prevent placing the tags D on the arm when the tags are attached to laundry nets. The rings permit the pins to swing freely out at the side and thus make room for the net material. The tag D is of a teardrop design which permits it easily to glide through a pile of nets without snagging the net material. The lower ends of the hangers C are drawn in or contracted, as indicated by $c$, FIGURES 2 and 3, to an extent that prevents the outer curved end B of the bar A or A' passing through the hanger if an attempt is made to thread the hanger on the arm above the slot level of the tag D. In other words, the outer curved end B of the spring plate A acts as a stop to prevent the threading of a tag D on the spring plate A. The curved end portion B of the spring plate A is used as a thumb piece, when threading a tag D on the arm, serving to open up the spring plate to permit the tag D to pass on to the arm. Also, the contours of the end portion B and the tag aperture E are such as to permit ready threading on the arm of only one of the tags D at a time, thus facilitating correct counting of the tags D on the arm.

The arm shown is designated by a lot number "01", and by a bundle number "1". The tags of the pin and tag assemblies are designated by the bundle number on the head portion G and by the lot number on the bottom portion H. Such manner of designation is particularly successful in avoiding confusion because the operator in checking must read the bundle number as she attempts to put the tag over the bar lock, and ordinarily her fingers cover up the lower lot number and only the upper bundle number is clearly visible for this assembly operation.

The separation of the bundle number and the lot number which has been described for the individual-piece pin is highly advantageous in that it brings the number, viz., the bundle number, which is most often referred to, into clear view and without any closely adjacent extraneous designations. Heretofore, the lot number and the bundle number have both been placed on the pin head, such as 19909 or 199–09 or $$\frac{199}{09}$$

for lot 199 and bundle 09. The pin head has been the only part of the pin which could be numbered. Such marking induces confusion because of the proximity of the lot number and the bundle number and the failure of the operator to distinguish which is which. The improved pin widely separates these two numbers and also places the one most frequently used in plain view without obstructions.

In the assembly area the arm set, FIGURE 1, and the lot control set, FIGURE 4, are placed in rack sockets on two parallel racks each have ten stations.

The improved individual-piece pin, FIGURE 1b, is a smooth one-piece nickle-plated brass item that is designed for use in a "lot" identification system. It can be successfully used for marking every article that passes through a laundry. There is no danger of snagging the garments in the laundry wash wheel because all garments having these pins secured thereto are protected by nets. These pins are double-headed, having a comparatively large upper end head $k$, FIGURE 1b, carrying the bundle number "1", and a comparatively small cap $k'$ at the bottom end carrying the lot number "01". The hanger $k^2$ of this pin is an endless loop wire which is integrated with the flange $k^3$, FIGURE 1, of the head $k$, and the flange $k^4$ of the cap $k'$. The head $k$ is formed with a key $k^5$ cooperating with the lock F of the arm of the arm set from which the pin depends.

A modified form of flag for a flag set is shown in FIGURE 7a. This flag differs from a standard form of flag shown in FIGURE 7 in that, instead of consisting of a tag or carrier at one end keyed for attachment to a "lot" arm and provided with a certain colored flag depending therefrom by a series of connecting rings and carrying the lot number, it comprises a metal tag M with an appropriate key $m$ fastened by tongues $m'$ to and within the periphery of a flexible waterproof fabric body $m^2$ of the desired color and carrying the lot number "01". The body $m^2$ is of a fabric material which will withstand laundry heats and detergents.

Figure 7B:
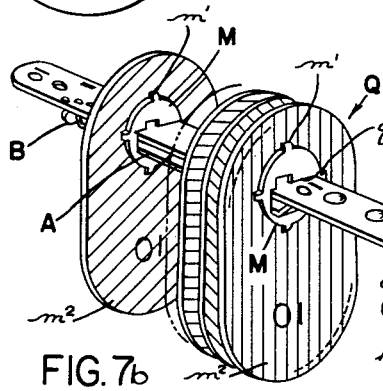
FIGURE 7b is a perspective view of a bundle checking arm having small pins and flags.

FIGURE 7b shows the use of small individual piece nickle-plated brass pins P and flags Q for identification of the pieces of a laundry bundle. These pins P and flags Q have keys $p$ and $q$ cooperating with the lock $r$ on arm R. The arm R is identical with the arm shown in FIGURE 1 and the pins P are mounted on one end of the arm and the flags Q on the other end. One of the arms with its complement of pins P and flags Q is assigned to each bundle. The arm, pins, and flags carry the bundle number and, if the bundle is a part of a lot, also the lot number. A standard set consists of an arm, fifteen individual-piece pins, and five flags. However, the arm has a capacity of more pins and flags.

The check-in girl breaks the bundle at the scales and each of the shirts, each piece of wearing apparel, and the several fugitives are pinned. The remainder of the bundle is accompanied to the washer-extractor-tumbler department by the arm. When the bundle is separated for the finishing operations, one of the flags is assigned to each group according to its finishing requirements.

Now, when the wrap-out girl assembles the bundle, she can select the necessary finished garments according to those that belong together by flag colors; also, all pins and flags of one arm have the same easy-to-read identifying number; and further, the flag and pin keys belonging to one arm are accommodated on only that arm.

The advantages of the instant improved equipment used in a laundry identification procedure such as herein described are as follows:

The initial cost of installing equipment for utilizing the system need not be out of line with the cost of installing present systems that give less satisfactory identification.

The maintenance costs of the necessary mechanical elements of the instant improved system are low and the supply costs negligible.

The cost of installing the system is quickly returned by reason of the many economies which can be effected in the operation of the various laundry departments involved.

The system is and the laundry identification and equipment are fast and easy to apply and permit full use of productive labor and equipment.

Inasmuch as the teaching of the operation of a system of laundry identification is very readily and easily accomplished, the training time of new operators is cut to a small fraction of that required for any general identification system now known.

As previously stated, these advantages are procured together with a return to the customer of a hundred percent accurate bundle.

What I claim is:

1. Laundry checking equipment comprising a strip arm having a lock, a tag and pin assembly hanging from the arm and having a tag with a slot therein snugly fitting the arm and formed with a key cooperating with the arm lock, a spring strip secured adjacent its inner end to the arm and disposed substantially parallel therewith, the spring strip retaining the tags on the arm and having an intermediate portion spaced from the arm and an outer curved terminal portion normally abutting the arm, the tag including a hollow endless wire reinforcement secured in the peripheral edge of the tag and continued around and beyond the spring strip, the assembly including a pin depending from the wire reinforcement, the side portions of the wire reinforcement beyond the spring strip being contracted so as to bound a space less in width than the width of the terminal of the spring strip, whereby a guide is provided ensuring the registry of the arm and the tag slot when it is desired to place a pin and tag assembly on the arm.

2. Laundry checking equipment, as in claim 1, in which a ring is secured loosely to and depends from the wire reinforcement, and in which the pin depends loosely from the ring.

3. A flag for laundry checking equipment comprising a fabric water-proof flexible body having identification insignia thereon, and a metal tak incorporated with and within the body and having a checking key slot formed therein.

4. Laundry checking equipment comprising an arm having a lock thereon, apertured tags passable over the arm and having keys cooperating with the arm lock, a spring strip retaining the tags on the arm, the spring strip being secured adjacent one of its ends to the lower face of the arm and being disposed a spaced distance from said arm face, the spring strip further having an opposite end curved portion normally abutting the lower face of the arm and serving as a thumb-piece for opening the spring strip when threading the tags onto the arm.

5. Laundry checking equipment, characterized as in claim 4, in which the tags each have a portion thereof cooperating with the curved end portion of the strip to prevent threading of the strip through the tag apertures.

6. Laundry checking equipment, characterized as in claim 4, in which the contours of the curved end portion of the strip and the tag apertures are such as to permit threading of only one tag at a time on the arm.

7. Laundry checking equipment comprising an arm having a lock thereon, a tag formed with a slot and snugly fitting the arm, the tag having a key cooperating with the arm lock, a spring strip retaining the tag on the arm and secured adjacent one of its ends to a lower face of the arm, disposed substantially parallel to the arm, having an intermediate portion thereof spaced from the arm, and an opposite end curved portion normally abutting said lower face of the arm, the tag having a part thereof confronting the spring strip and formed with an aperture bounding a space less in width than the width of the spring strip, said tag part depending below the strip, whereby the flexing of the strip under spring tension is limited and a guide is provided ensuring the registry of the arm and the tag slot when it is desired to thread a tag onto the arm.

References Cited in the file of this patent

UNITED STATES PATENTS

| | | |
|---|---|---|
| 1,412,631 | Richter | Apr. 11, 1922 |
| 1,438,629 | Bradley | Dec. 12, 1922 |
| 1,698,112 | Todd | Jan. 8, 1929 |
| 1,892,774 | Miller | Jan. 3, 1933 |
| 1,929,974 | Hanney | Oct. 10, 1933 |
| 2,257,323 | Baxter | Sept. 30, 1941 |
| 2,323,220 | Hewett | June 29, 1943 |
| 2,443,343 | Crocker | June 15, 1948 |
| 2,455,606 | Pleiss | Dec. 7, 1948 |